United States Patent
Grob et al.

(10) Patent No.: US 6,467,255 B1
(45) Date of Patent: Oct. 22, 2002

(54) METHOD FOR OPERATING AN INTERNAL COMBUSTION ENGINE, ESPECIALLY OF A MOTOR VEHICLE

(75) Inventors: Ferdinand Grob, Besigheim; Uwe Maienberg, Leonberg, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/600,287

(22) PCT Filed: Nov. 11, 1999

(86) PCT No.: PCT/DE99/03587

§ 371 (c)(1), (2), (4) Date: Jul. 14, 2000

(87) PCT Pub. No.: WO00/29736

PCT Pub. Date: May 25, 2000

(30) Foreign Application Priority Data

Nov. 14, 1998 (DE) .......................................... 198 52 600

(51) Int. Cl.[7] .................................................. F01N 3/00
(52) U.S. Cl. .............................. 60/274; 60/286; 477/97; 477/100
(58) Field of Search ........................... 60/274, 285, 286, 60/295; 123/295, 305, 481; 477/98, 97, 100, 107, 46, 47, 115, 109, 111

(56) References Cited

U.S. PATENT DOCUMENTS

| | | | |
|---|---|---|---|
| 4,489,695 A | * 12/1984 | Kohama et al. | 123/481 |
| 4,732,130 A | * 3/1988 | Suzuki | 477/111 |
| 4,823,642 A | * 4/1989 | Iwaki et al. | 477/111 |
| 4,972,737 A | * 11/1990 | Makimoto | 477/98 |
| 5,295,416 A | * 3/1994 | Miyashita et al. | 477/100 |
| 5,468,195 A | * 11/1995 | Kashiwabara | 477/46 |
| 5,470,290 A | * 11/1995 | Minowa et al. | 477/115 |
| 5,472,673 A | 12/1995 | Masato et al. | |
| 5,622,049 A | * 4/1997 | Kitamura et al. | 60/285 |
| 5,643,133 A | * 7/1997 | Minowa et al. | 477/107 |
| 5,875,761 A | * 3/1999 | Fujieda et al. | 477/111 |
| 5,997,434 A | * 12/1999 | Graf et al. | 477/98 |
| 6,006,717 A | * 12/1999 | Suzuki et al. | 123/295 |
| 6,026,779 A | * 2/2000 | Obata et al. | 123/295 |
| 6,063,004 A | * 5/2000 | Ibamoto et al. | 477/47 |
| 6,065,443 A | * 5/2000 | Mizuno et al. | 123/295 |
| 6,079,204 A | * 6/2000 | Sun et al. | 60/274 |
| 6,161,517 A | * 12/2000 | Sans | 123/295 |
| 6,188,944 B1 | * 2/2001 | Kolmanovsky et al. | 477/100 |

FOREIGN PATENT DOCUMENTS

| | | | |
|---|---|---|---|
| EP | 0 829 623 | | 3/1998 |
| EP | 0 860 594 | | 8/1998 |
| EP | 0 888 921 | | 1/1999 |
| JP | 08 200045 | | 12/1996 |
| WO | WO 98/31927 | * | 7/1998 |

* cited by examiner

*Primary Examiner*—Thomas Denion
*Assistant Examiner*—Tu M. Nguyen
(74) *Attorney, Agent, or Firm*—Walter Ottesen

(57) ABSTRACT

An internal combustion engine (1) especially for a motor vehicle is described. The engine is provided with an injection valve (10) with which the fuel is injected for a combustion, can be injected directly into a combustion chamber (4) of a cylinder (3) in a first operating mode during an induction phase and in a second operating mode during a compression phase. A spark plug (11) is provided with which the fuel, which is injected in both operating modes, is ignited. A catalytic converter (13) is provided for storing nitrous oxides arising during the combustion. With a control apparatus (12), the operating variables of the engine (1) can be controlled (open-loop and/or closed-loop) in both operating modes. A gear change into another gear stage and a switchover into the first operating mode can be carried out approximately simultaneously by the control apparatus (12). The switchover into the first operating mode is provided for discharging the nitrous oxides stored in the catalytic converter (13).

3 Claims, 4 Drawing Sheets

METHOD FOR OPERATING AN INTERNAL COMBUSTION ENGINE, ESPECIALLY OF A MOTOR VEHICLE

FIELD OF THE INVENTION

The invention relates to a method for operating an internal combustion engine especially of a motor vehicle wherein the fuel, which is to be injected for a combustion, is injected directly into the combustion chamber of a cylinder in a first operating mode during an induction phase and in a second operating mode during a compression phase and is thereafter ignited in both operating modes. In this method, nitrogen oxides, which develop during the combustion, are stored in a catalytic converter. Likewise, the invention relates to an internal combustion engine especially for a motor vehicle having an injection valve with which the fuel, which is to be injected for a combustion, can be injected directly into a combustion chamber of a cylinder in a first operating mode during an induction phase and in a second operating mode during a compression phase. The engine includes a spark plug with which the injected fuel can be ignited in both operating modes and also includes a catalytic converter for storing nitrous oxides developing during the combustion. The engine has a control apparatus for controlling (open-loop and/or closed-loop) operating variables of the engine in both operating modes.

BACKGROUND OF THE INVENTION

Systems for the direct injection of fuel into the combustion chamber of an internal combustion engine are generally known. In these systems, a first operating mode, a so-called homogeneous operation, and a second operating mode, a so-called stratified charge operation or, in short, stratified operation are distinguished. The stratified operation is used especially for small and medium loads; whereas, the homogeneous operation is used when larger loads are applied to the engine.

In the stratified operation, the fuel is injected into the combustion chamber during the compression phase of the engine in such a manner that a fuel cloud is disposed at the time point of the ignition in the direct vicinity of a spark plug. This injection can take place in different ways. Accordingly, it is possible that the injected fuel cloud is already during or directly after the injection in the vicinity of the spark plug and is ignited thereby. Likewise, it is possible that the injected fuel cloud is guided by a charge movement to the spark plug and is only then ignited. In both combustion methods, no uniform fuel distribution is present; instead, a stratified charge is present.

The advantage of the stratified operation is that the applied small and medium loads can be carried out by the engine with a very small amount of fuel. However, larger loads cannot be satisfied by the stratified operation.

In the homogeneous operation which is provided for such larger loads, the fuel is injected during the induction phase of the engine so that a swirling and therefore a distribution of the fuel in the combustion chamber can easily take place. To this extent, the homogeneous operation corresponds approximately to the mode of operation of internal combustion engines wherein the fuel is injected into the intake manifold in the conventional way. As required, the homogeneous operation can be used also for smaller and medium loads.

In stratified operation, the throttle flap is opened wide in the intake manifold leading to the combustion chamber and the combustion is essentially controlled (open-loop and/or closed-loop) only by the fuel mass to be injected. In the homogeneous operation, the throttle flap is opened or closed in dependence upon the requested torque and the fuel mass, which is to be injected is controlled (open-loop and/or closed-loop) in dependence upon the inducted air mass.

In both modes of operation (that is, in stratified operation and in homogeneous operation), the operating variables for the injection of fuel (that is, the injection duration and the injection start, for example) and the operating variables for the ignition of the injected fuel (that is, for example, the ignition time point) are controlled (open-loop and/or closed-loop) in dependence upon a plurality of additional operating variables of the engine to an optimal value with a view to saving fuel, reducing exhaust gas and the like. The control (open-loop and/or closed-loop) is different in the two operating modes.

It is perforce required that there be a switching back and forth between the two operating modes of the engine, that is, the homogeneous operation and the stratified operation. Here, it is required that these switchovers take place free of jolts.

The occurring exhaust gases are treated catalytically to reduce the emission of toxic substances. For this purpose, usually a three-way catalytic converter is provided with which HC compounds and CO compounds are oxidized and NOx compounds can be reduced. The last-mentioned nitrous oxides develop especially during the stratified operation. However, in this operating state, an oxygen excess is present because of the lean air/fuel mixture so that the nitrous oxides cannot be fully reduced in the three-way catalytic converter.

For this reason, an additional storage catalytic converter is assigned to the three-way catalytic converter wherein the nitrous oxides can be intermediately stored. The storage catalytic converter must again be discharged or emptied because of the limited storage capacity thereof. This takes place during the homogeneous operation of the engine. An oxygen deficiency is present during the homogeneous operation because of the rich air/fuel mixture. This has the consequence that the stored nitrous oxides are released from the storage catalytic converter and can be reduced by the three-way catalytic converter.

For this reason, it is necessary for a low toxic substance stratified operation of the engine that the storage catalytic converter is not completely charged and/or is discharged in time and therefore is not overloaded.

SUMMARY OF THE INVENTION

It is a task of the invention to provide a method for operating an internal combustion engine as well as an internal combustion engine wherein a required discharge of the storage catalytic converter can be carried out more conveniently.

This task is solved in a method of the above-mentioned kind in that a gear change into another gear stage and/or into another transmission ratio range and a switchover into the first operating mode are executed approximately simultaneously. The switchover into the first operating mode is provided for discharging the nitrous oxides stored in the catalytic converter. In an internal combustion engine of the type mentioned initially herein, the task is solved in accordance with the invention in that a gear change into another gear stage and a switchover into the first operating mode can be carried out by the control apparatus approximately simultaneously. The switchover into the first operating mode is provided for discharging the nitrous oxides which are stored in the catalytic converter.

With a gear change, a switchover of the operating mode into the homogeneous operation is executed approximately simultaneously. This has two advantages. On the one hand, it is achieved via the homogeneous operation that the storage catalytic converter is discharged. At the same time, an overcharge of the storage catalytic converter is thereby avoided. An output of nitrous oxides to the environment thereby does not take place. On the other hand, with the gear change, a possible jolt of the engine is covered over because of the operating mode change. The perception of such a jolt is therefore substantially minimized by the gear change. The engine thereby exhibits a quiet and uniform running even for a change of the operating mode.

In an advantageous embodiment of the invention wherein the gear change is required but wherein really no switchover into the first operating mode is necessary for the gear change, however the catalytic converter is filled, a switchover into the first mode of operation takes place approximately simultaneously with the gear change in order to discharge the catalytic converter. In this case, a gear change is required; a change of operating mode is, however, not really required. For discharging the storage catalytic converter, a switchover into the homogeneous operation, however, takes place during the gear change. In this way, an overcharge of the storage catalytic converter is, on the one hand, avoided. On the other hand, a jolt-free operating mode change is achieved.

In another advantageous embodiment of the invention, wherein the gear change is required, a switchover into the first operating mode takes place approximately simultaneously with the gear change in order to discharge the catalytic converter even though no switchover into the first mode of operation is really required for the gear change and the catalytic converter is not yet charged or only charged a small amount. This defines a precautionary discharge of the storage catalytic converter. Even though the storage catalytic converter is really not or only slightly charged, the converter is discharged early or in anticipation. In this way, an overcharge of the catalytic converter is reliably avoided.

In a further advantageous embodiment of the invention, wherein the catalytic converter is filled and wherein there is a switchover into the first operating mode in order to discharge the catalytic converter and wherein the gear change is really not required, the gear change is executed nonetheless simultaneously with the switchover into the first operating mode. This presents the reverse case. The gear change is not required but possible and purposeful. The discharge of the storage catalytic converter is, in contrast, necessary. In order that a possibly occurring jolt for the operating-mode change (which is to be executed) is perceptible as little as possible, a gear change is executed approximately simultaneously with the switchover into the homogeneous operation.

It is especially advantageous when the gear change into another gear stage is substituted with a switchoff of one of several cylinders. The methods and functions described above are therefore no longer executed in connection with a gear change into another gear stage; instead, and in lieu thereof, at least one of the cylinders of the engine is shut off. A cylinder switchoff of this kind has the consequence that the other cylinders must provide more power. For this purpose, it is necessary to control (open-loop and/or closed-loop) the other cylinders in a different manner. This transition to the higher power is then used in accordance with the invention to switch from the stratified operation into the homogeneous operation. In this way, it is achieved, on the one hand, that the storage catalytic converter is discharged by the homogeneous operation. On the other hand, with the cylinder switchoff, it is achieved that a possibly occurring jolt can hardly be perceived by the driver of the vehicle. This jolt occurs with the switchover of the operating mode.

Of special significance is the realization of the method of the invention in the form of a control element which is provided for a control apparatus of an internal combustion engine, especially of a motor vehicle. A program is stored on the control element which can run on a computing apparatus, especially on a microprocessor, and is suitable for executing the method of the invention. In this case, the invention is realized by a program stored on the control element so that this control element, which is provided with the program, defines the invention in the same manner as the method for which the program is suitable for carrying out. An electrical storage medium can be utilized as a storage element such as a read-only-memory.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
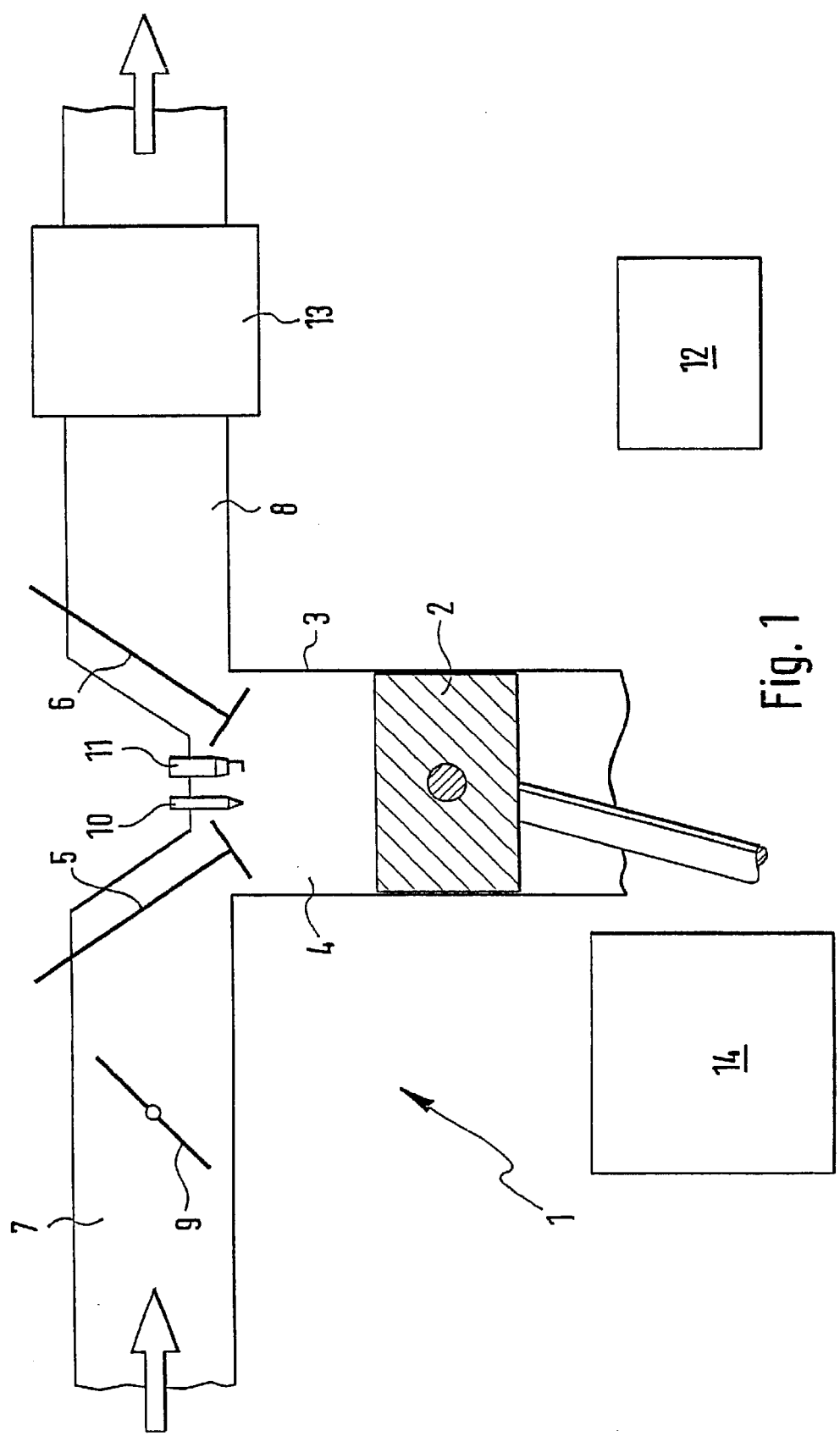
FIG. 1 shows a schematic representation of an embodiment of an internal combustion engine of the invention.

In FIG. 1, an internal combustion engine 1 of a motor vehicle is shown wherein a piston 2 is movable back and forth in a cylinder 3. The cylinder 3 is provided with a combustion chamber 4 which is delimited, inter alia, by the piston 2, one or several inlet valves 5, and one or more inlet valves 6. An intake manifold 7 is coupled with the inlet valve 5 and an exhaust-gas pipe 8 is coupled with the outlet valve 6.

A rotatable throttle flap 9 is accommodated in the intake manifold 7 and air is supplied via the throttle flap to the intake manifold 7. The quantity of the supplied air is dependent upon the angular position of the throttle flap 9.

An injection valve 10 is assigned to the cylinder 3. With the injection valve 10, fuel can be injected into the combustion chamber 4 of the engine 1. Likewise, a spark plug 11 is assigned to the cylinder 3 with which the injected fuel can be ignited.

The back and forth movement of the piston 2 is transferred to a crankshaft (not shown) and imparts a rotational movement thereto.

In a first operating mode, a so-called homogeneous operation of the engine 1, the throttle flap 9 is partially opened or closed in dependence upon the desired supplied air mass. The fuel is injected into the combustion chamber 4 by the injection valve 10 during an induction phase caused by the piston 2. The injected fuel is swirled by the simultaneously inducted air and is thereby distributed essentially uniformly in the combustion chamber 4. Thereafter, the air/fuel mixture is compressed during the compression phase in order to then be ignited by the spark plug 11. The piston 2 is driven by the expansion of the ignited fuel.

In a second operating mode, a so-called stratified operation of the engine 1, a throttle flap 2 is opened wide. The fuel is injected into the combustion chamber 4 by the injection valve 10 during a compression phase caused by the piston 2. This injection takes place spatially in the direct vicinity of the spark plug 11 as well as, in time, at a suitable spacing ahead of the ignition time point. Then, the fuel is ignited with the aid of the spark plug 11 so that the piston 2 is driven in the following work phase by the expansion of the ignited fuel.

The fuel mass injected into the combustion chamber 4 in the stratified operation and in the homogeneous operation by the injection valve 10 is controlled (open-loop and/or closed-loop) with respect to a low fuel consumption and/or a low generation of toxic substances. For this purpose, the control apparatus is provided with a microprocessor which has a program stored in a storage medium such as a read-only-memory. The program is suitable to execute the above-mentioned control (open-loop and/or closed-loop).

Input signals are applied to the control apparatus 12 and these signals define operating variables of the engine measured by sensors. For example, the control apparatus is connected to an air mass sensor, a lambda sensor and an rpm sensor. Furthermore, the control apparatus 12 is connected to an accelerator pedal sensor which generates a signal which indicates the position of an accelerator pedal actuated by a driver. The control apparatus 12 generates output signals with which the performance of the engine 1 is influenced via actuators in correspondence to the desired control (open-loop and/or closed-loop). For example, the control apparatus is connected to the injection valve 10, the spark plug 11 and the throttle flap 9 and generates the signals required for driving the latter.

A catalytic converter 13 is contained in the exhaust-gas pipe 8 of the engine 1. The catalytic converter 13 includes an oxidation catalytic converter for oxidizing HC compounds and CO compounds, a reduction catalytic converter for the reduction of NOx compounds and a storage catalytic converter for storing NOx compounds.

A lean air/fuel mixture is present in the stratified operation so that an oxygen excess exists. This excess oxygen is taken up by the reduction catalytic converter so that this converter can no longer reduce nitrous oxides. The storage catalytic converter is provided so that the NOx compounds cannot be emitted to the environment. The storage catalytic converter stores the NOx-compounds arising during stratified operation. This defines a loading operation of the storage catalytic converter. The HC compounds and the CO compounds are oxidized by the oxidation catalytic converter.

A rich air/fuel mixture can be present in the homogeneous operation so that an oxygen deficiency exists. Because of the oxygen deficit, the reduction catalytic converter can liberate the oxygen from the NOx compounds. These compounds are thereby outputted by the storage catalytic converter and reduced by the reduction catalytic converter. This defines a discharge operation or a clearing of the storage catalytic converter. The HC compounds and the CO compounds continue to be oxidized by the oxidation catalytic converter.

The storage capacity of the storage catalytic converter is limited. The filling operation can therefore only take place for a specific time duration. Thereafter, the storage catalytic converter must again be discharged. If the stratified operation would be continued without a discharge even though the storage catalytic converter is completely charged, then this would have the consequence that nitrous oxides would be emitted to the environment.

An automatic transmission 14 is assigned to the internal combustion 1 and this transmission can, for example, be a so-called stepped automatic transmission or the like. The shifting operations of the automatic transmission 14 are controlled (open-loop and/or closed-loop) by the control apparatus 12. The automatic transmission 14 can be caused by the control apparatus 12 to undergo a gear change into a higher or a lower gear stage.

The method for operating the engine 1 is described below with reference to FIGS. 2 to 4. The method is executed by the control apparatus 12. With the method, an overloading of the storage catalytic converter is avoided and the change of the operating mode to unload the storage catalytic converter, is carried out as comfortably as possible.

Figure 2:
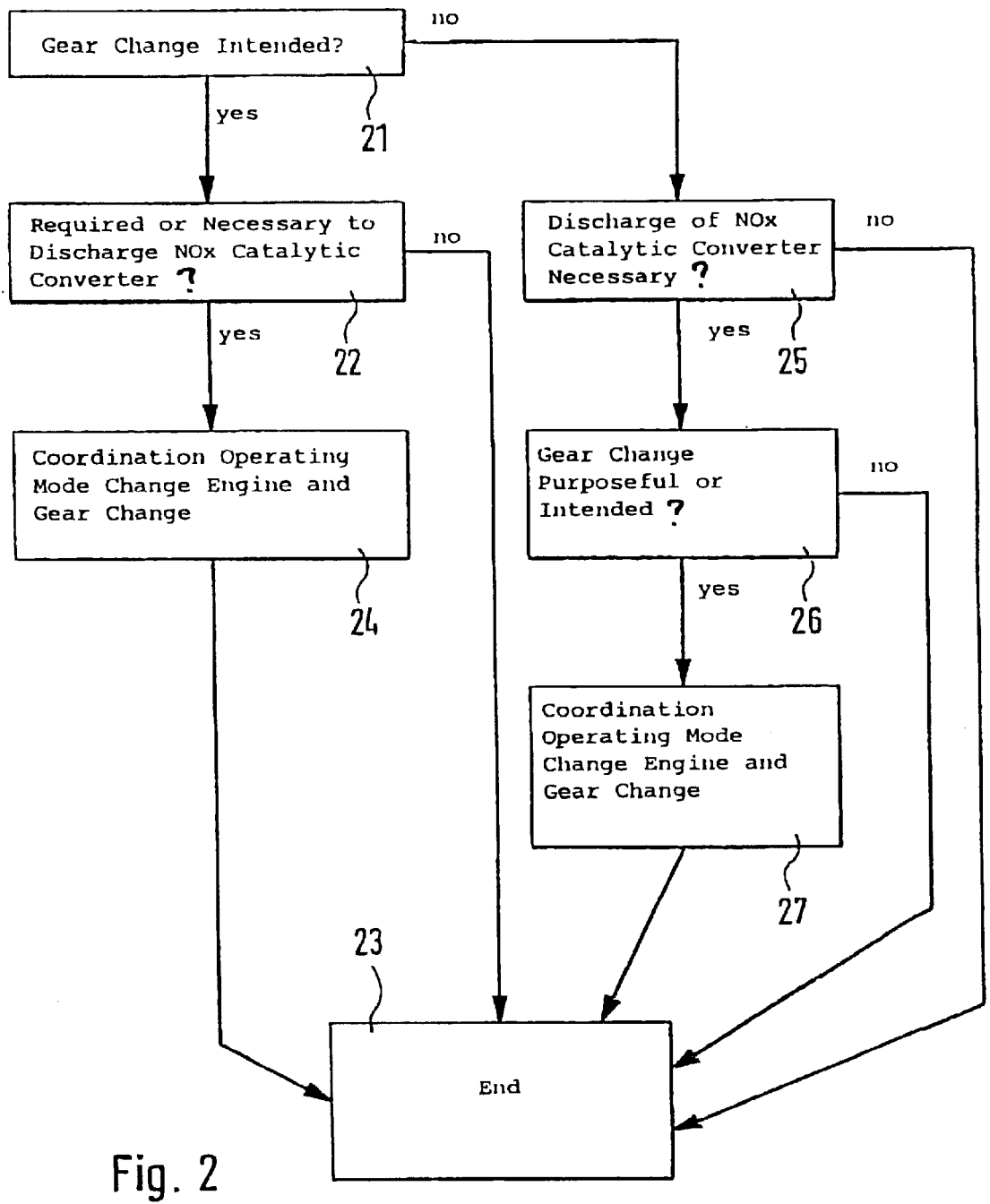
FIG. 2 shows a schematic block circuit diagram of an embodiment of a method according to the invention for operating the engine of FIG. 1.

In FIG. 2, a method is described with which a gear change into another gear stage of the transmission 14 and a switchover into the first operating mode (that is, into the homogeneous operation) are approximately simultaneously carried out. The switchover into the first operating mode is provided for discharging the nitrous oxides stored in the catalytic converter 13. With the switchover into the homogeneous and the approximately simultaneous gear change, a possible jolt from the operating-mode switchover is covered over by the gear change so that the jolt is hardly perceived by a driver of the motor vehicle.

Figure 3:
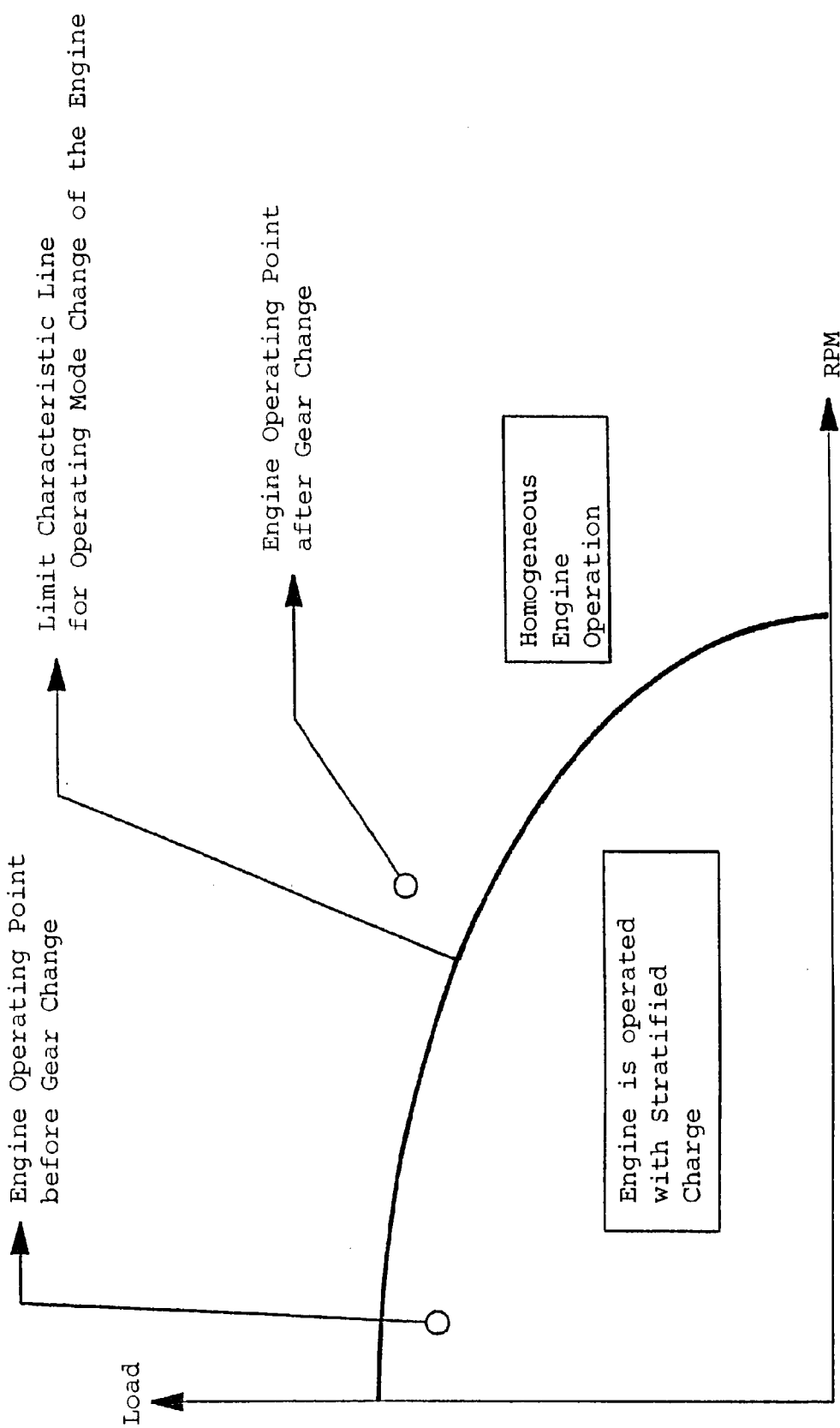
FIG. 3 shows a schematic diagram for explaining the method of FIG. 2 with a gear change; and, FIG. 4 shows a schematic diagram for explaining the method of FIG. 2 with a cylinder shutoff.

In FIG. 3, the gear change and the operating mode change, which is carried out approximately simultaneously, are again shown in a diagram. In the diagram, the load applied to the engine 1 is plotted as a function of the rpm of the engine 1. Before the gear change, the engine operating point lies in a region of the diagram wherein the engine is operated in the second operating mode, that is, in the stratified operation. An operating mode change takes place approximately simultaneously with the gear change. For this reason, the engine operating point after the gear change lies in a region of the diagram wherein the engine is operated in the first operating mode, that is, the engine is operated in homogeneous operation.

For this purpose, the control apparatus checks in accordance with FIG. 2 in a step 21 as to whether a gear change is intended or is required. If this is the case, then, in step 22, a check is made by the control apparatus 12 as to whether it is required or necessary to discharge the storage catalytic converter. This is the case when the storage catalytic converter is completely filled.

If the storage catalytic converter is not completely filled, and therefore a discharge thereof is not required, then the method is ended with a block 23.

If, in contrast, the storage catalytic converter is completely filled and it is therefore necessary to discharge the storage catalytic converter, then the required gear change is carried out approximately simultaneously with a switchover into the homogeneous operation by the control apparatus 12 in a step 24. The switchover into the first operating mode is carried out even if the switchover would not be required with a view to the control (open-loop and/or closed-loop) of the two operating modes. The storage catalytic converter is discharged by the subsequent homogeneous operation. The perception of a possible jolt during the switchover into the homogeneous operation is reduced by the simultaneous gear change.

Additionally, the step 24 can also be carried out when a discharge of the storage catalytic converter in and of itself would not be required, that is, when the storage catalytic converter is not completely filled. In this case, a switchover into the homogeneous operation can take place nonetheless approximately simultaneously with the gear change in order to discharge the storage catalytic converter early or in anticipation.

If it is determined by the control apparatus 12 in step 21 that no gear change is intended or required, then in step 25, a check is made by the control apparatus 12 as to whether it is necessary or required that the storage catalytic converter be discharged. This is the case, when the storage catalytic converter is completely filled.

If this is not the case, then the method is ended with block 23.

If, however, it is required to discharge the storage catalytic converter, then a check is made by the control apparatus in step 26 as to whether a gear change is instantaneously intended or is required or whether a gear change appears at least to be purposeful.

If this is not the case, then the method can again be ended with block 23.

If in contrast, a gear change is intended or at least purposeful, then the gear change is executed approximately simultaneously with the required switchover into the homogeneous operation by the control apparatus 12 in a step 27. The switchover into the first operating mode is also executed when the switchover would not be required with a view to the control (open-loop and/or closed-loop) of the two operating modes. The storage catalytic converter is discharged by the subsequent homogeneous operation. The perception of a possible jolt during the switchover into the homogeneous operation is reduced by the simultaneous gear change.

It is possible to replace the described gear change into another gear stage, which is executed by the transmission 14, by a switchoff of one or several cylinders 3 of the engine 1. In a cylinder switchoff of this kind, the injection valve 10 of the cylinder(s) 3, which is (are) to be switched off, is no longer controlled. Correspondingly, the spark plug 12 must no longer be necessarily actuated. The power, which is required from the engine 1, must then be developed by the other cylinders 3. For this purpose, these other cylinders 3 of the engine 1 must be controlled (open-loop and/or closed-loop) in a different manner in order to provide the higher power.

Figure 4:
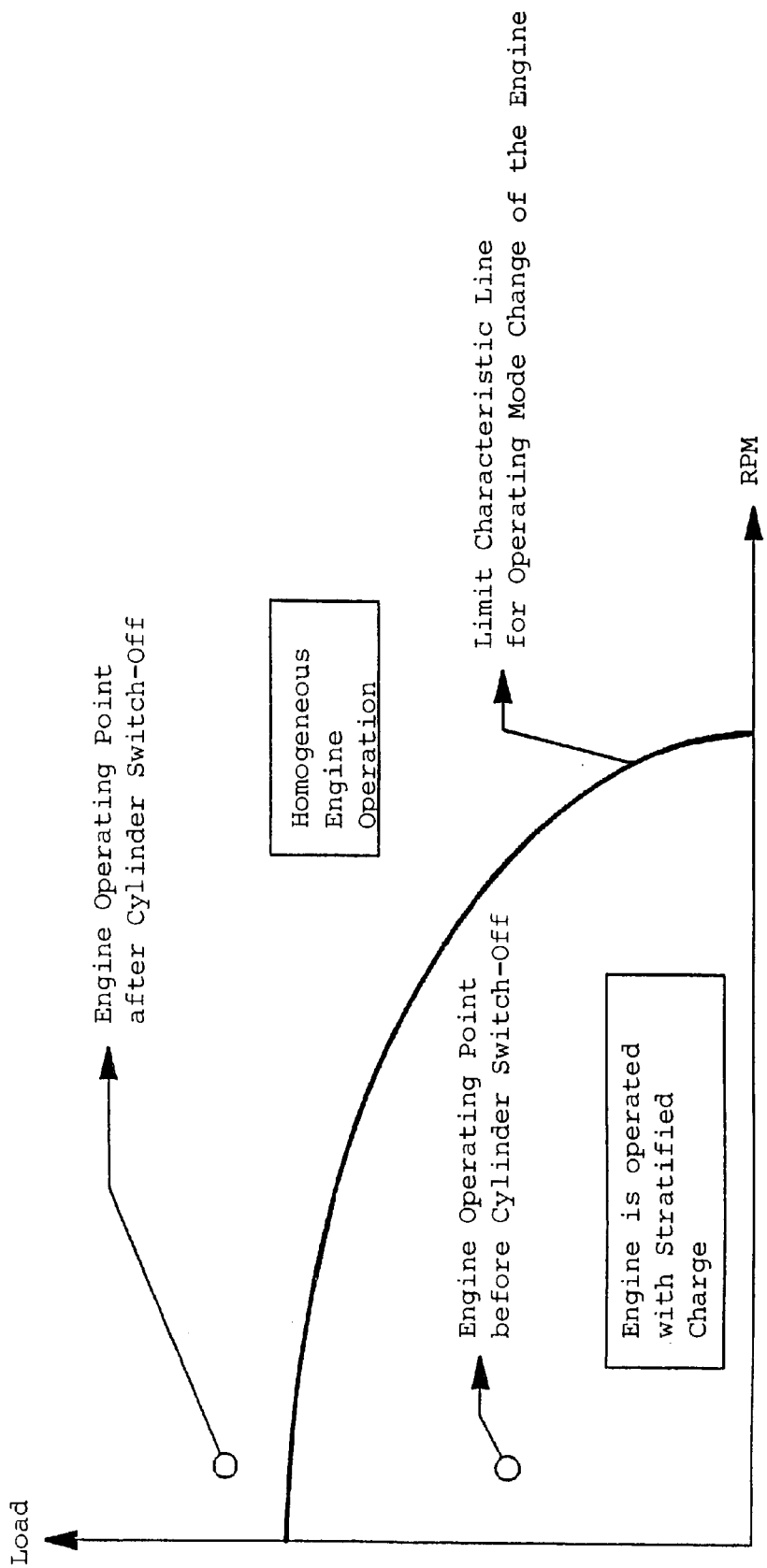

In FIG. 4, a cylinder cutoff and an approximately simultaneously executed operating mode change are shown in a diagram. In the diagram, the load, which is applied to the engine 1, is plotted as a function of the rpm of the engine 1. Before the cylinder switchoff, the engine operating point lies in a region of the diagram wherein the engine is operated in the second operating mode, in stratified operation. A change of operating mode takes place approximately simultaneously with the cylinder switchoff. After the cylinder switchoff, the engine operating point therefore lies in the region of the diagram wherein the engine is operated in the first operating mode, that is, the engine is operated in homogeneous operation. There, the actively participating cylinders 3 of the engine 1 are in a position to provide the increased power because of the homogeneous air/fuel mixture of the homogeneous operation. At the same time, the storage catalytic converter is simultaneously discharged by the homogeneous operation as described in connection with a gear change. Because of the approximately simultaneous cylinder switchoff and operating mode switchover, the perception of a possible jolt during the switchover into the homogeneous operation is reduced.

What is claimed is:

1. A method for operating an internal combustion engine including an engine of a motor vehicle, the method comprising the steps of:

injecting fuel for combustion directly into a combustion chamber of a cylinder and igniting the injected fuel in a first operating mode during an induction phase and, independently of said first operating mode, injecting fuel for combustion directly into said combustion chamber and igniting the injected fuel in a second operating mode during a compression phase with nitrous oxides, which arise during the combustion, being stored in a catalytic converter; and carrying out a gear change into another gear stage or into another gear ratio region;

wherein: when the gear change is required; no switchover into the first operating mode is required for the gear change; the catalytic converter is not yet charged or is charged slightly; and, a switchover nonetheless takes place into the first operating mode approximately simultaneously with the gear change in order to discharge the catalytic converter.

2. An internal combustion engine including an engine for a motor vehicle, the engine comprising:

an injection valve for injecting the fuel for a combustion directly into a combustion chamber of a cylinder in a first operating mode during an induction phase and, independently of said first operating mode, injecting fuel for combustion directly into said combustion chamber in a subsequent second operating mode during a compression phase;

a spark plug for igniting the fuel in said first and second operating modes;

a catalytic converter for storing nitrous oxides arising during the combustion; and, a control apparatus for controlling the operating variables of the engine in the two operating modes in at least one of an open-loop and a closed-loop control;

wherein said control apparatus functioning to carry out a gear change into another gear stage or into another gear ratio region; and, wherein: when the gear change is required; no switchover into the first operating mode is required for the gear change; the catalytic converter is not yet charged or is charged slightly; and, a switchover nonetheless takes place into the first operating mode approximately simultaneously with the gear change in order to discharge the catalytic converter.

3. A control element including a read-only-memory for a control apparatus for an internal combustion engine including an engine of a motor vehicle an which a program is stored which is capable of being run on a computing apparatus including a microprocessor and is suitable for carrying out a method comprising the steps of: injecting fuel for combustion directly into a combustion chamber of a cylinder and igniting the fuel injected in a first operating mode during an induction phase and, independently of said first operating mode, injecting fuel for combustion directly into said combustion chamber and igniting the injected fuel in a second operating mode during a compression phase with nitrous oxides, which arise during the combustion; being stored in a catalytic converter; and carrying out a gear change into another gear stage or into another gear ratio region;

wherein: when the gear change is required; no switchover into the first operating mode is required for the gear change; the catalytic converter is not yet charged or is charged slightly; and, a switchover nonetheless takes place into the first operating mode approximately simultaneously with the gear change in order to discharge the catalytic converter.

* * * * *

UNITED STATES PATENT AND TRADEMARK OFFICE
CERTIFICATE OF CORRECTION

PATENT NO.    : 6,467,255 B1
DATED         : October 22, 2002
INVENTOR(S)   : Ferdinand Grob and Uwe Maienberg It is certified that error appears in the above-identified patent and that said Letters Patent is hereby corrected as shown below:

<u>Column 8,</u>
Line 45, delete "an" and substitute -- on -- therefor.
Line 55, delete "combustion;" and substitute -- combustion, -- therefor.

Signed and Sealed this

Nineteenth Day of August, 2003

JAMES E. ROGAN
*Director of the United States Patent and Trademark Office*